United States Patent [19]

Holz

[11] 4,288,274

[45] Sep. 8, 1981

[54] METHOD OF AND APPARATUS FOR APPLYING VENEER FOILS TO A BOARD

[75] Inventor: Karl-Heinz Holz, Krefeld, Fed. Rep. of Germany

[73] Assignee: G. Siempelkamp GmbH & Co., Krefeld, Fed. Rep. of Germany

[21] Appl. No.: 105,880

[22] Filed: Dec. 21, 1979

[30] Foreign Application Priority Data

Dec. 22, 1978 [DE] Fed. Rep. of Germany ....... 2855870

[51] Int. Cl.³ .......................................... B32B 31/00
[52] U.S. Cl. ................................. 156/364; 156/557; 156/559; 156/563; 271/9; 271/12; 271/14; 271/98
[58] Field of Search ............... 156/362, 363, 364, 556, 156/557, 558, 563, 297–298; 271/9, 12, 14, 98; 270/58

[56] References Cited

U.S. PATENT DOCUMENTS

| | | | |
|---|---|---|---|
| 1,645,824 | 10/1927 | Shipley | 271/98 X |
| 2,255,777 | 9/1941 | Jones | 271/9 UX |
| 3,033,740 | 5/1962 | D'Amato et al. | 156/556 X |
| 3,415,707 | 12/1968 | Barnes | 156/557 |
| 3,723,227 | 3/1973 | Oono et al. | 156/557 |
| 3,785,508 | 1/1974 | Hayden | 156/563 X |

*Primary Examiner*—David A. Simmons

*Attorney, Agent, or Firm*—Karl F. Ross

[57] ABSTRACT

An apparatus for making a laminate has a rack having upper and lower vertically displaceable platforms adapted to support respective stacks of upper and lower foils and set up so that the uppermost foils of the respective stacks are always positioned at respective upper and lower levels. A central conveyor has an upstream stretch extending horizontally between the upper and lower platforms from a position upstream of these platforms to a position spaced downstream therefrom, so that it can displace a board in a transport direction between these platforms to an assembly location downstream of the platforms. Upper and lower horizontally displaceable carriages provided generally at the respective levels with suction lifters are displaceable between upstream positions above the respective stacks and downstream positions above respective upper and lower conveyors whose downstream ends terminate at the assembly location so that the uppermost foils can be picked off the stacks at these levels and deposited by the suction lifters on the upper and lower conveyors. In their turn the upper and lower conveyors transport these foils to the assembly location where they are applied to the upper and lower faces of the board, and the thus-formed sandwich is then transported away for pressing into a decorative laminate.

3 Claims, 2 Drawing Figures

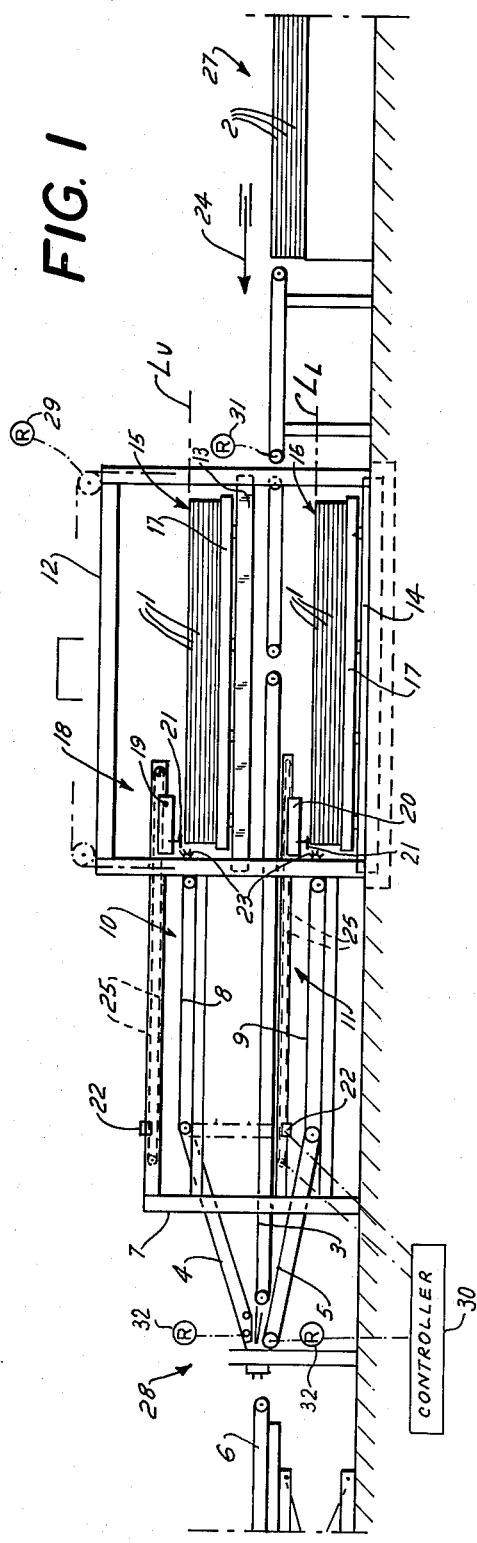
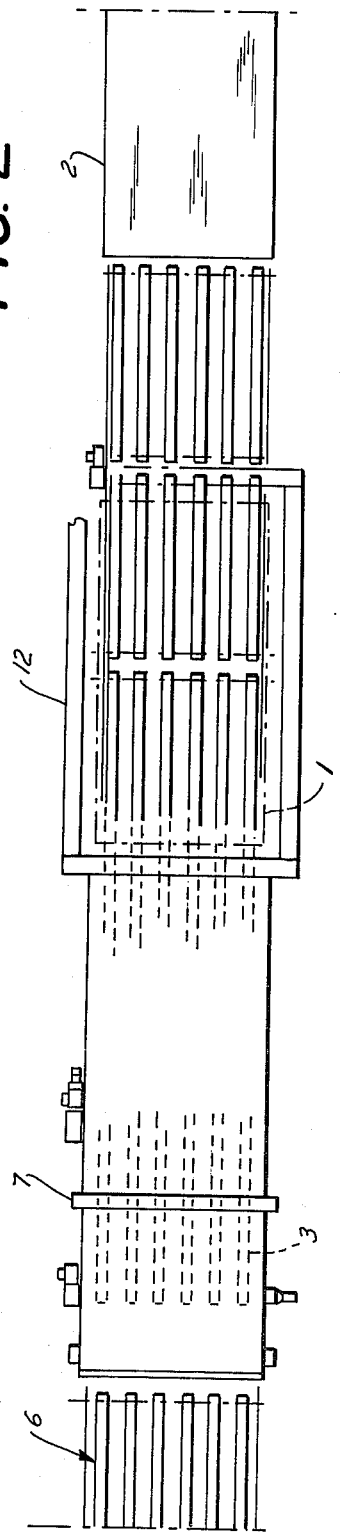

METHOD OF AND APPARATUS FOR APPLYING VENEER FOILS TO A BOARD

FIELD OF THE INVENTION

The present invention relates to a method of and an apparatus for applying veneer foils to a board. More particularly this invention concerns such a method and apparatus used to make decorative paneling.

BACKGROUND OF THE INVENTION

It is known to make paneling and the like by applying a decorative veneer foil to one or both sides of a board formed of inexpensive plywood, chipboard, or the like. The finished product has considerable physical strength and the attractive appearance of the veneer foils that it carries on its outer face or faces. Although it was originally the practice to manually assemble the sandwich that was later pressed into the finished product, in modern times the process has been largely automated.

In a standard such machine, such as described in U.S. Pat. No. 3,415,707 and its equivalent, German patent publication No. 1,703,981 filed Aug. 8, 1968 by D. Barnes, the system basically comprises upper and lower conveyors that vertically flank a central conveyor. The central conveyor feeds a board to an assembly location, and the upper and lower conveyors feed the foils also to this location so that the board becomes sandwiched between them at the assembly location. This arrangement is extremely complex and requires a great deal of sensitive process-monitoring equipment in order to form a sandwich with a central board and a pair of foils neatly flanking it. In fact the apparatus must normally be stretched out over a considerable horizontal length in the plant, so that the various equipment can ensure that the various parts of the sandwich are properly positioned before they arrive at the assembly location.

As such an arrangement is normally used with a heated press having a relatively fast cycling time, it is necessary that the system be able to produce the sandwiches ready for pressing at a rate at least equal to the cycling time of the press.

Devices are also known, as for example in U.S. Pat. No. 3,599,968 of Billett and West, to form a stack of foils, however such arrangements are not suitable for the manufacture of fine paneling and are also extremely bulky and complex.

OBJECTS OF THE INVENTION

It is therefore an object of the present invention to provide a method of and apparatus for making a laminate.

Another object is to provide an improved method of and apparatus for sandwiching a board between a pair of foils, with the foils being properly aligned with the board.

Yet another object is to provide such a method and apparatus which can operate at high speed, which take up minimal floor space, and which are relatively uncomplicated.

SUMMARY OF THE INVENTION

These objects are attained according to the instant invention in an apparatus having a rack provided with upper and lower vertically displaceable platforms that are adapted to support respective stacks of upper and lower foils. A central conveyor has an upstream stretch extending horizontally between the upper and lower platforms to an assembly location spaced downstream from the platforms and a downstream stretch extending from this location away from the platforms for displacing a board in a transport direction between the platforms to the assembly location. Means is connected to the platforms for vertically displacing them to position the uppermost foils of the respective stacks at respective upper and lower levels, and respective upper and lower conveyors have upstream ends substantially at these levels and downstream ends at the assembly location. Pickup means is provided including upper and lower horizontally displaceable carriages provided generally at the respective levels with suction lifters and displaceable between upstream positions above the respective stacks and downstream positions above the respective upper and lower conveyors for picking the uppermost foils off the stacks at the levels and depositing them on the upper and lower conveyors. Control means is connected to the carriages and all of the conveyors for operating them synchronously so as to sandwich a board between one of the lower foils and one of the upper foils at the assembly location, and for transporting the sandwich thus formed away from the assembly location in the transport direction by means of the downstream stretch of the central conveyor.

The system according to the instant invention takes up minimal floor space, as the stacks of the relatively thin foils are superposed, whereas the relatively thick board they are applied to is fed in from an upstream supply. By means of relatively simple control means it is possible to obtain almost perfect registration of the foils with the board, so that trimming after hot-pressing of the thus-formed laminate is minimal.

According to further features of the invention the control means includes edge detectors at the upper and lower conveyors for sensing the leading edge of a foil. In this manner even if the foil slips slightly on the suction lifters, the machine will automatically be able to adjust and still properly position the foils on the board.

According to another feature of this invention the conveyors are all formed as suction-belt conveyors, that is as suction belts which ride atop suction boxes whose low pressure is effective through the belts on the boards and foils to hold them firmly in place on the belts.

According to yet another feature of this invention means is provided for separating foils from each other when the suction lifters pick up more than one as the result of electrostatic cling or the like. This means is constituted most simply as an air jet facing upstream and provided at the respective level at the upstream edge of each stack, so that in the event the suction lifters raise more than one foil, the jet of air will work between them and surely separate them.

It is, of course, possible to use the apparatus according to this invention to laminate a foil onto only the upper or lower side of a board. Nonetheless with the system according to the instant invention the travel distance for the individual foils and boards is relatively reduced, and the equipment is relatively simple, so that it is possible for it to operate at a high speed.

BRIEF DESCRIPTION OF THE DRAWING

FIG. 1 is a partly schematic side view of the apparatus according to the instant invention; and FIG. 2 is a top view of the apparatus shown in FIG. 1.

SPECIFIC DESCRIPTION

The apparatus according to the instant invention basically serves to apply relatively thin decorative foils 1 to the upper and lower faces of a rigid board 2, normally of plywood. The apparatus is centered on a central conveyor 3 defining a horizontal transport direction 24 and serving to displace the boards 2 from a storage location 27 to an assembly location 28. Downstream of the assembly location 28 a downstream section 6 of the central conveyor 3 displaces the sandwiches formed by the apparatus according to this invention to a hot press. An electric motor 31 operates the conveyor 3.

The foils 1 are provided in upper and lower stacks 15 and 16 supported on pallets 17 on respective upper and lower platforms 13 and 14 themselves vertically displaceable on a rack 12. Means is provided such as motors 29 connected to the platforms 13 and 14 to vertically displace them on the frame 12 so that the uppermost foils of the stacks 15 and 16 lie at respective levels $L_U$ and $L_L$, as determined by feelers, photoelectric eyes, or the like, and as controlled by a main controller 30.

Immediately downstream in the direction 24 of the stacks 15 and 16 are respective upper and lower conveyors 10 and 11 having respective upstream sections 8 and 9 whose upper reaches lie at the levels $L_U$ and $L_L$, and downstream portions 4 and 5 which angle respectively downwardly and upwardly to the assembly location 28. These conveyors 10 and 11 are carried on a rack 7 and are operated by respective motors 32 which themselves are operated by the controller 30. The frame 7 also supports pickoff means 18 in the form of upper and lower loading carriages 19 and 20 provided with suction lifters 21 and displaceable downstream in direction 24 from the upstream positions above the stacks 15 and 16 shown in FIG. 1. Chain drives 25 operated by the controller 30 can displace these carriages 19 and 20 independently of each other.

The frame 7 also carries position detectors 22 at the upper and lower upstream sections 8 and 9 of the conveyors 10 and 11.

Finally air jets 23 are provided for separating foils 1 from each other as will be described below.

According to this invention the controller 30 operates the various drives in accordance with the various sensed positions so that foils 1 are picked off the stacks 15 and 16 and deposited on the upstream sections 8 and 9 of the conveyors 10 and 11 in exact positions. This is most easily established by merely releasing the foils 1 from the suction lifters 21 as soon as the front-edge detectors 22 sense the front edges of the foils 1. To this end it is noted that the suction lifters 21 are of the type which, when connected to a vacuum source, automatically extend downwardly somewhat so that they can attach themselves, suction-cup-fashion, to a flat smooth object. Meanwhile the controller 30 has displaced a board 2 by means of the conveyor 3 to a position immediately upstream of the assembly location 28. In the event that due to electrostatic cling or the like a foil 1 adheres to the underside of a foil being picked up by the suction lifters 21, the air blasts 23 will ensure that this lower foil is stripped off.

Thereupon the conveyors 10, 11 and 3 are operated synchronously so as exactly to position the board 2 between two foils 1, with the foils 1 in exact registration with the board 2. Normally no more than 2 mm of overlap or undershooting is encountered with this machine using standard control technology. It is, however, possible to have the stacks 15 and 16 offset by as much as 20 mm, but this loose tolerance can be compensated out by means of the edge detectors 22.

Once the sandwich is formed the conveyor 6 carries it away and, by appropriate raising and lifting, can deposit it in a platen press for hot-pressing.

Thus the system according to the instant invention is extremely simple and relatively short, yet it can produce high-quality products suitable for hot-pressing into attractive laminates.

I claim:

1. In an apparatus for making a laminate, said apparatus comprising:
   a rack having upper and lower vertically displaceable platforms adapted to support respective stacks of upper and lower foils;
   means connected to said platforms for vertically displacing same to position the uppermost foils of the respective stacks at respective upper and lower levels;
   transport means including a central conveyor having an upstream stretch extending horizontally between said upper and lower platforms to an assembly location spaced downstream in a transport direction from said platforms and a downstream stretch extending from said location away from said platforms for displacing a board in said transport direction between said platforms to said assembly location;
   respective upper and lower suction-belt conveyors having upstream ends substantially at said levels and downstream ends at said assembly location, said upper and lower conveyors having respective horizontal upstream stretches substantially at the respective levels and respective downwardly and upwardly inclined downstream stretches extending from the respective upstream stretches to said assembly location;
   pickup means including upper and lower horizontally displaceable carriages provided generally at the respective levels with suction lifters and displaceable between upstream positions above the respective stacks and downstream positions above said upstream stretches of the respective upper and lower conveyors for picking the uppermost foils off said stacks at said levels and depositing them on the upstream stretches of said upper and lower conveyors, said carriages being displaceable horizontally in said direction the full length of the respective upstream stretches; and
   control means connected to said conveyors and to said carriages for sandwiching said board between one of said lower foils and one of said upper foils at said assembly location and then transporting the sandwich away from said location in said direction.

2. The apparatus defined in claim 1 wherein said control means includes means for sensing the leading edge of a foil at predetermined locations on said upper and lower conveyors.

3. The apparatus defined in claim 1, further comprising means including an air jet immediately upstream of each of said stacks for separating foils picked up by said lifters and preventing same from picking up more than one foil at a time.

* * * * *